United States Patent [19]

Spivey

[11] 4,426,116
[45] Jan. 17, 1984

[54] TIRE RIM AND SPOKE ARRANGEMENT TO DISCOURAGE TIRE THEFT

[75] Inventor: Paul B. Spivey, Jacksonville, Fla.

[73] Assignee: Seaboard CoastLine Railroad Co., Jacksonville, Fla.

[21] Appl. No.: 407,126

[22] Filed: Aug. 11, 1982

[51] Int. Cl.³ .................. B60B 1/00; B60B 23/00
[52] U.S. Cl. .................. 301/9 R; 301/10 R; 301/95; 301/12 R; 301/37 AT
[58] Field of Search .......... 301/37 AT, 9 R, 10 DC, 301/10 R, 11 R, 12 R, 17, 95, 96, 97, 25

[56] References Cited

U.S. PATENT DOCUMENTS

| | | | |
|---|---|---|---|
| 1,577,455 | 3/1926 | Dulany | 301/10 DC |
| 1,797,304 | 3/1931 | Waterbor | 301/12 R |
| 1,857,747 | 5/1932 | Vanderveer | 301/10 DC |
| 2,099,895 | 11/1937 | Kendierski | 301/11 R |
| 3,862,778 | 1/1975 | Cory | 301/10 DC |
| 4,203,382 | 5/1980 | Mullen | 280/762 X |
| 4,213,654 | 7/1980 | Furrow | 301/95 X |
| 4,277,107 | 7/1981 | Stone | 301/13 SM |

Primary Examiner—David A. Scherbel
Assistant Examiner—Russell D. Stormer
Attorney, Agent, or Firm—Robert S. Auten

[57] ABSTRACT

A rim supporting a tire thereon has facing projecting portions along a mounting rim thereon and one of these portions has a recess fitting a raised portion on an outer peripheral face of one of a plurality of spokes on a spoke assembly on which the rim is designed to be removably secured. The other raised portion aids in balancing the tire and rim and prevents shifting of the rim to avoid an interlocking fit of the raised portion on the spoke assembly within the recess on the rim as it is removably secured on the spoke assembly. While this rim can only be received on the specially designed spoke assembly this spoke assembly is adapted to receive rims in common use which do not have the novel facing projecting portions.

4 Claims, 5 Drawing Figures

TIRE RIM AND SPOKE ARRANGEMENT TO DISCOURAGE TIRE THEFT

BACKGROUND OF THE INVENTION

The railroad companies of the United States are, and have been for a number of years, engaged in piggyback operations, i.e. in the hauling of truck trailers on railroad cars.

Within the whole area of these operations the Piggyback Industry has had a continuous and increasingly costly problem with the theft of tires from the trailers. The majority of such thefts are characterized by what is known as "quick change-outs" and this involves swapping the entire wheel and tire, including the rim, for a similar rim and a poorer tire, often one which is virtually worn out.

Naturally, as such practices are costly to the Piggyback Industry, many attempts have been made to control and prevent this type of theft. So called Tattlecaps, as for example a device to provide an indication that the rim and tire have been removed from a vehicle hub, as shown in U.S. Pat. No. 4,203,382, have been used.

Another approach to the problem is shown in U.S. Pat. No. 4,277,107 were specially designed bolts are used to secure the tire on its rim to the wheel hub so as to make it difficult, if not impossible, to remove the wheels from the hubs.

Other approaches include the use of color-coded tires as well as molding identification marks into the tire.

The above described approaches have been only partially effective because they act simply as psychological deterrents and do not attack the basic incentive for the "quick change-out", i.e. the fact that a wheel rim carrying a good tire can be quickly swapped for another wheel rim carrying a less desirable tire.

BRIEF SUMMARY AND OBJECTS OF THE INVENTION

The invention involves a compatable rim and spoke arrangement in which one of the spokes on the spoke assembly or hub conventionally used in the dual wheel assemblies supporting the trailers used in Piggyback service is modified as is the rim. It is the inventors understanding that a 20 inch rim and a spoke assembly having a 5 - spoke hub are most commonly used in the Piggyback Industry. However it is contemplated that the basic arrangement, according to the invention, can be used in other sized rims and with other hubs.

U.S. Pat. No. 4,277,107, previously mentioned, shows a conventional arrangement of dual wheel assemblies supporting a trailer and reference is made to that patent for a more detailed description of the manner in which the rims carrying the tires are secured to wheel hubs rotatably supported on one or more rear axles of the trailer.

Briefly the inner wheel of the dual wheel assembly is slipped over the peripheral surfaces or faces of the radially extending spokes of the hub and are positioned inwardly thereof when the mounting ridge on the rim abuts against a flange on the hub.

As is conventional the hub is secured to a brake drum housing of the dual wheel assembly and the spokes of the hub extend outwardly, with reference to such brake drum housing, and have at their outer extermities, adjacent the peripheral surfaces previously mentioned, threaded studs.

A spacer is slipped over the peripheral surfaces of the spokes to abut against the mounting ridge of the rim abutting against the flange on the hub. This sleeve provides an abutting surface against which the mounting ridge on a rim carrying a tire can abut when this rim is slipped over the peripheral surfaces of the spokes so as to position the outer wheel of the dual wheel assembly.

Finally clamps are slipped over the threaded studs on each spoke and nuts are placed on the studs in order to tighten portions of the clamps against the mounting ridge on the outer wheel and clamp both wheels in engagement with the hub.

According to the invention the peripheral surface or face of a spoke on a hub is notched at both sides thereof to leave an upstanding central portion thereon which is of less width then the remainder of the peripheral faces on the spokes but its peripheral surface remains the same distance from the axis of the hub as that of each of the remaining spokes.

For engagement of a rim with this modified form of the conventional hub two diametrically opposite raised areas are provided on the rim mounting ridge. One area has a notch cut to the depth so that this notch is slidably engageable over the upstanding central portion on the one spoke.

To ensure that, according to the invention, the modified rim must, when wheels are slipped onto or taken off the modified hub, interengage with the upstanding central portion of the one spoke on the hub, the other area is so disposed as to slip between a pair of spokes only when the compatable surfaces on the one area of the rim and the raised central portion of the spoke are in correct alignment.

It is apparent from the above that if the modified hub and rim, as according to the invention, are provided on trailers in piggyback service the modified rims would tend to discourage "quick change-outs" because the rims would not fit the hubs of other trailers not provided with the modified hub. On the other hand the modified hub still can accept the convention rim if this is desired.

In view of the above it is therefore the object of the invention to provide a modified hub and rim assembly wherein the hub can receive both the modified rim and a conventional rim but wherein the modified rim is not usuable with a conventional hub.

DESCRIPTION OF PREFERRED EMBODIMENT OF THE INVENTION

Figure 1:
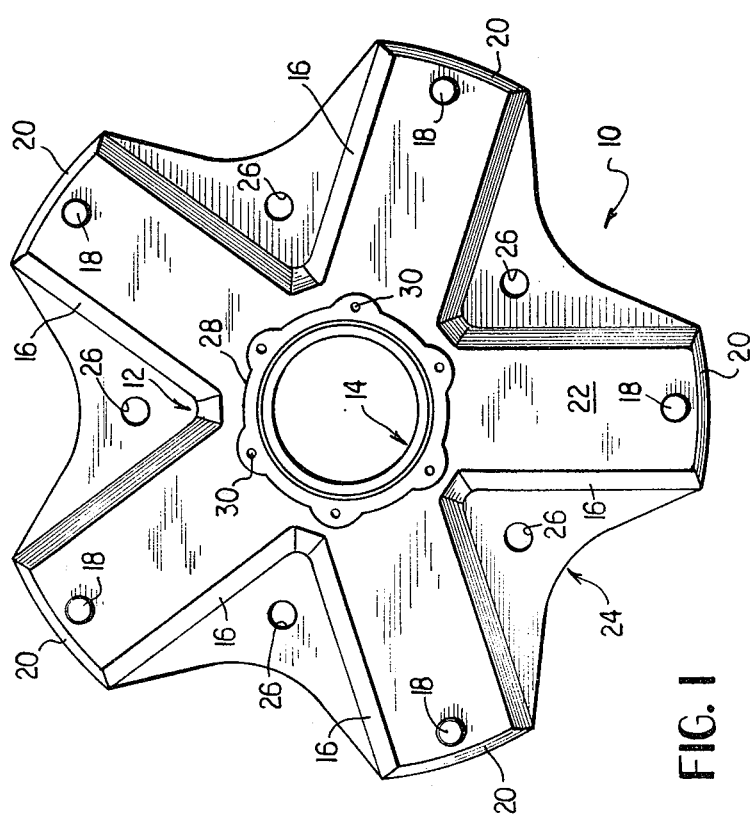
FIG. 1 is a front elevational view of a conventional spoke assembly or hub.
Figure 4:
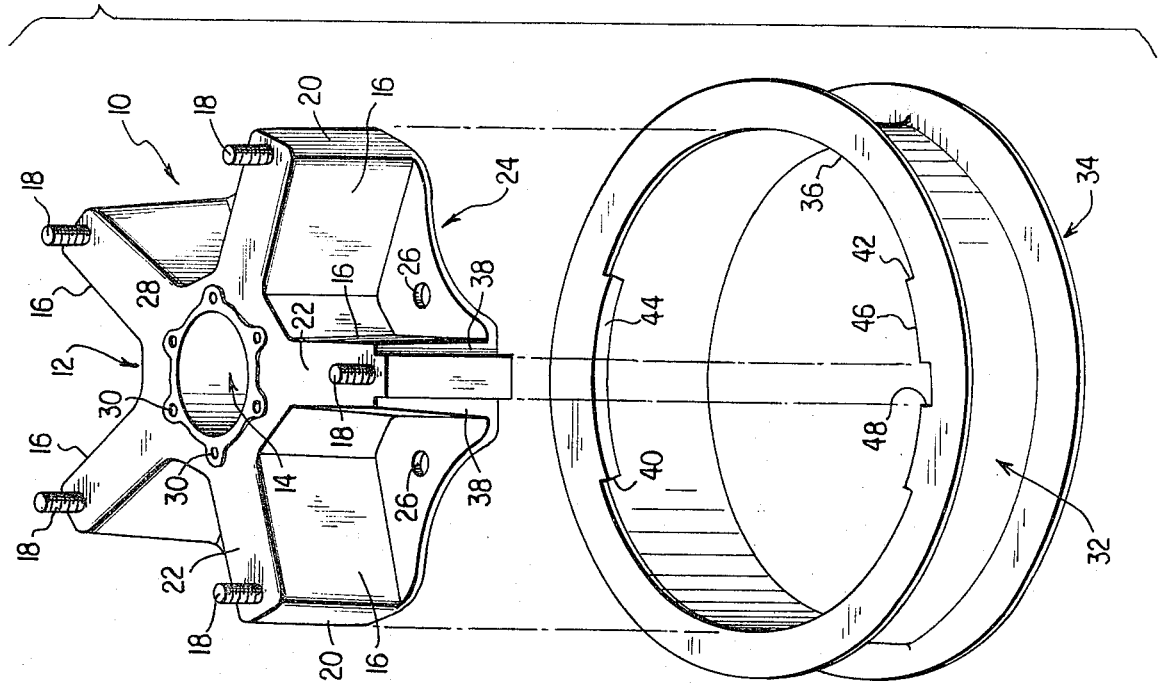
FIG. 4 is an exploded perspective view of a hub or spoke assembly and a rim showing a peripheral face of a spoke modified according to the invention and the rim lip modified according to the invention.

Looking at FIG. 1 of the drawing and also at FIG. 4 it will be seen that the hub or spoke assembly generally indicated at 10, has a central portion, generally indicated at 12, with an axially extending opening therein and generally indicated at 14. Projecting radially from the central portion 12 are a plurality of spokes 16 which are spaced apart equally and also extend an appreciable distance axially. The outer portions of each spoke 16 carries a threaded stud 18 which is upstanding and extends in an axial direction.

Each spoke terminates outwardly in a peripheral face 20 which extends axially rearwardly from a top surface 22 on spoke 16. Each peripheral face 20 is at the same distance, radially, from the central portion 12.

The individual spokes merge into a back plate-like portion, generally indicated at 24, and openings 26 are provided in this portion with an opening between adjacent spokes. Opposite this plate-like portion 24 the central portion 12 has a raised portion 28 having a plurality of internally threaded openings 30.

In a conventional manner, as seen for example in U.S. Pat. No. 4,277,107, previously referred to, hub 10 is secured as with bolts and nuts, not shown, to a brake drum housing, also not shown. An end portion of an axle, not shown, extends into opening 14 and suitable journal means, not shown, are provided so hub 10 is rotatably supported on the axle. The openings 30 are provided so that a hub cap, not shown, can be attached by suitable bolts, not shown, to the hub 10.

With a conventional hub 10 extending in axial continuation of an axle of a dual wheel assembly used to support a trailer employed in Piggyback Service the rims carrying tires on their outer perimeters can be slid, axially, over the hubs 10 and be releasably secured thereon.

Figure 2:
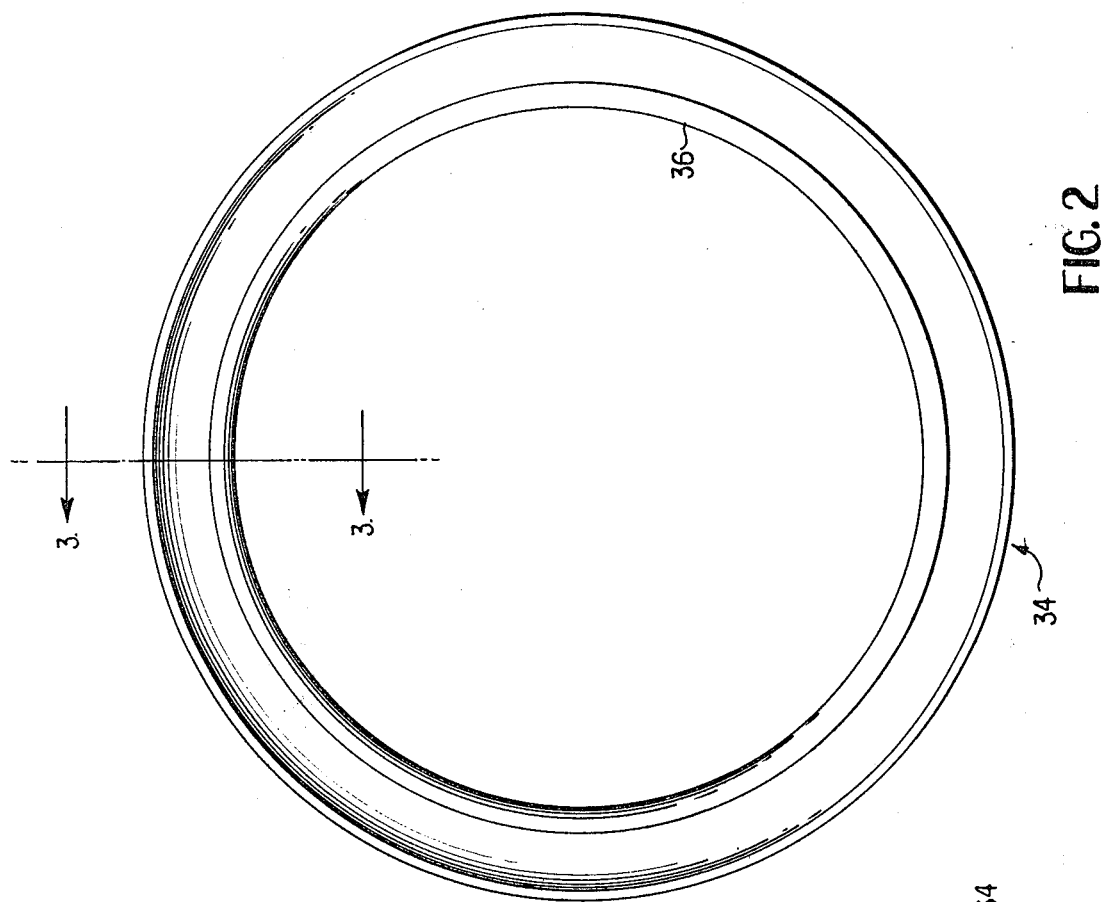
FIG. 2 is a front elevational view of a conventional rim designed to be releasably securable on the spoke assembly of FIG. 1.
Figure 3:
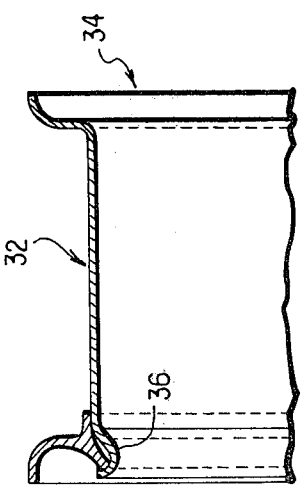
FIG. 3 is a sectional view taken along the line 3—3 in FIG. 2.

FIG. 2 and FIG. 3 show the conventional rim as having basically an outer periphery, generally indicated at 32, which carries a tire, not shown. The rim, generally designated by the reference numeral 34 is provided with a cylindrical inside surface having an annular inward projection 36 at the outer end thereof. This projection or rim lip 36 slidably engages the peripheral faces 20 on the spokes 16 as the rims 34 with their associated tires are suitably mounted on the hubs 10.

Turning now to the modification provided, according to the invention, attention is directed to FIG. 4 where it will be seen that a peripheral face 20 of one of the spokes 16 has been reduced in its circumferential width by notches 38, which notches extend axially along spoke 16.

Figure 5:
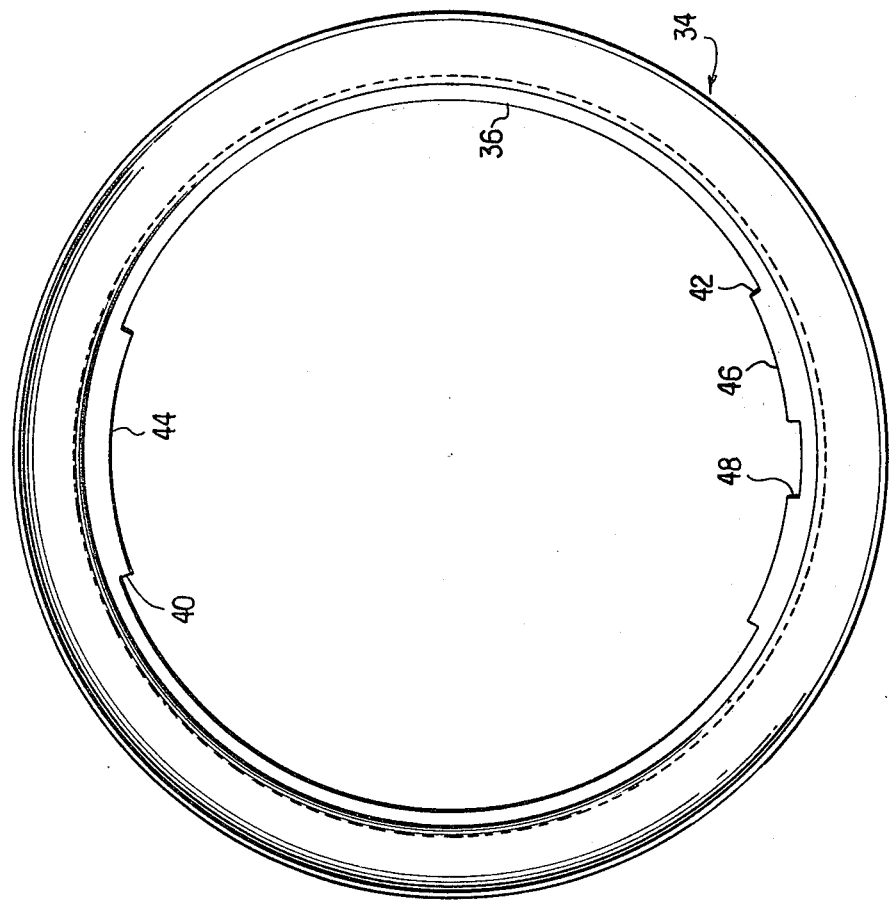
FIG. 5 is a front elevational view of a rim similar to that of FIG. 2 but showing the rim as modified according to the invention.

FIG. 4 and FIG. 5 show the modifications made in the conventional rim 34 as according to the invention. Raised areas 40 and 42 extend inwardly toward each other from the inner peripheral surface or rim lip 36 and are diametrically opposed to each other. Area 40 extends in a smooth circumferential face 44 while in raised area 42 the circumferential face 46 is broken by a notch 48 therein of a mid portion thereof.

In an embodiment of the invention being tested by the inventor the raised areas extend inwardly ¼ of an inch, are ⅞ inches wide and raised area 20 has a length, circumferentially, of 6½ inches while raised area 42 has side portions, each 3½ inches long, on either side of notch 48 that is of a length of 2 inches.

The notches in the peripheral face 20 of the spoke 16 are ½ inch deep and leave the peripheral face with a reduced, as compared to the faces of other spokes, circumferential length of 1¾ inches.

From the above it will be appreciated that the modified rim as seen in FIG. 5 is axially slidable only over a hub as modified in the manner seen in FIG. 4 where the peripheral face 20 of reduced width is embraced within notch 48.

It should be pointed out that the raised area 40 serves to prevent the rim 34 from being shifted or used on a conventional hub or spoke assembly because this raised area rests between a pair of adjacent spokes only when the notch 48 in raised area 42 is aligned with the spoke have the peripheral face 20 of reduced width. Furthermore the raised area 40 is necessary to maintain balance of the rim with an associated tire.

What I claim is:

1. In combination, a cylindrical rim, designed to carry a tire around an outer perimeter thereof, and axially slidably receivable, along an inner peripheral surface, over a hub having a plurality of spokes, said hub having a central portion with an axially exending opening therein designed to receive an end portion of an axle for rotatable movement of said hub on said axle, said spokes extending radially outwardly, in spaced relationship, from said central portion and terminating in outwardly directed peripheral faces which are circumferentially disposed at the same distance radially from said central portion, said spokes also extending axially on said hub, said rim being slidably receivable axially over said peripheral faces of said spokes along an axial length thereof and being selectively securable thereon, the improvement comprising:

A. Notches formed adjacent the peripheral face of one of said spokes and reducing the circumferential width of said peripheral face; and B. A pair of raised areas extending toward each other at spaced apart and diametrically opposed portions of the inner peripheral surface of said cylindrical rim, each of said areas having circumferentially extending faces and each of said faces being concentrically disposed with respect to said inner peripheral surface of said rim, one of said raised areas having a notch therein at the circumferentially extending face thereof, said notch being of a width, circumferentially, greater then the circumferial width of said peripheral face of said one spoke of said hub; whereby said rim is axially slidably receivable over said hub when said peripheral face of said one of said spokes is received within said notch and the other area is received in a space between a pair of said spokes other than said one spoke, and whereby said rim is not slidably receivable over a hub not having, on one spoke thereof a compatable notched peripheral face.

2. The improvement as defined in claim 1 wherein said notches in said peripheral face are disposed at spaced apart positions to extend axially along said one of said spokes.

3. The improvement as defined in claim 2 wherein said notches are disposed at positions at each extremity of said peripheral face in its circumferential direction.

4. The improvement as defined in claim 1 wherein said notch in said one of said raised area is disposed in a central position of said area with respect to the circumferentially extending face thereof.

* * * * *